(12) United States Patent
Hoshino

(10) Patent No.: US 10,248,344 B2
(45) Date of Patent: Apr. 2, 2019

(54) CONTROL DEVICE

(71) Applicant: NEC Corporation, Tokyo (JP)

(72) Inventor: Tomonori Hoshino, Tokyo (JP)

(73) Assignee: NEC Corporation, Tokyo (JP)

( * ) Notice: Subject to any disclaimer, the term of this patent is extended or adjusted under 35 U.S.C. 154(b) by 40 days.

(21) Appl. No.: 15/426,285

(22) Filed: Feb. 7, 2017

(65) Prior Publication Data

US 2017/0228187 A1 Aug. 10, 2017

(30) Foreign Application Priority Data

Feb. 8, 2016 (JP) .................................. 2016-021982

(51) Int. Cl.
*G06F 3/06* (2006.01)
(52) U.S. Cl.
CPC .......... *G06F 3/0625* (2013.01); *G06F 3/0629* (2013.01); *G06F 3/0665* (2013.01); *G06F 3/0683* (2013.01)

(58) Field of Classification Search
CPC .... G06F 3/0625; G06F 3/0629; G06F 3/0665; G06F 3/0683
See application file for complete search history.

(56) References Cited

U.S. PATENT DOCUMENTS

| | | | | |
|---|---|---|---|---|
| 2005/0138285 A1* | 6/2005 | Takaoka | ................... | G06F 3/061 711/114 |
| 2007/0061512 A1* | 3/2007 | Taguchi | ................. | G06F 1/3221 711/114 |
| 2009/0271645 A1* | 10/2009 | Mori | ..................... | G06F 1/3221 713/320 |
| 2010/0332882 A1* | 12/2010 | Nayak | .................. | G06F 3/0625 713/324 |
| 2012/0096289 A1* | 4/2012 | Kawakami | ............ | G06F 1/3221 713/320 |
| 2013/0262904 A1* | 10/2013 | Kazama | ................ | G06F 1/3221 713/340 |
| 2014/0006816 A1* | 1/2014 | Oikawa | ................. | G06F 1/3268 713/310 |
| 2014/0133240 A1* | 5/2014 | Chen | ..................... | G11C 5/148 365/185.18 |

(Continued)

FOREIGN PATENT DOCUMENTS

| | | |
|---|---|---|
| JP | 2004-334561 | 11/2004 |
| JP | 2007-115232 | 5/2007 |

(Continued)

OTHER PUBLICATIONS

Office Action dated Jan. 31, 2017, by the Japanese Patent Office in counterpart Japanese Patent Application No. 2016-021982.

*Primary Examiner* — Hiep T Nguyen
(74) *Attorney, Agent, or Firm* — Finnegan, Henderson, Farabow, Garrett & Dunner, L.L.P.

(57) ABSTRACT

A control device of the present invention includes: a storage part which retains a storage device list including an operation performance of each storage device and a power consumption corresponding to the operation performance; and a configuration determination part which, on the basis of the storage device list, determines a storage device combination configuration realizing the minimum power consumption of the whole logical volume formed of a combination of storage devices when the logical volume operates under a set operation performance condition.

18 Claims, 10 Drawing Sheets

(56) References Cited

U.S. PATENT DOCUMENTS

2015/0095572 A1\* 4/2015 Koike .................. G06F 3/0634
            711/114

FOREIGN PATENT DOCUMENTS

| JP | 2009-110451 | 5/2009 |
| JP | 2012-523593 | 10/2012 |
| JP | 2012-523595 | 10/2012 |
| JP | 2013-97635 | 5/2013 |
| JP | 2013-206101 | 10/2013 |

\* cited by examiner

Fig. 2

SSD OF COMPANY A

| DRIVE No. | | A1 | A2 | A3 |
|---|---|---|---|---|
| DRIVE CAPACITY | | 800 GB | 1600 GB | 3200 GB |
| IN WRITING | MAXIMUM IOPS | 90000 | 150000 | 175000 |
| | POWER CONSUMPTION (W) | 18 | 22 | 25 |
| | POWER CONSUMPTION PER kIOPS | 0.200 | 0.147 | 0.143 |
| IN READING | MAXIMUM IOPS | 460000 | 450000 | 450000 |
| | POWER CONSUMPTION (W) | 8 | 10 | 11 |
| | POWER CONSUMPTION PER kIOPS | 0.017 | 0.022 | 0.024 |
| POWER CONSUMPTION IN IDLE TIME | | 2 | 2 | 2 |

Fig. 3

SSD OF COMPANY B

| DRIVE No. | | B1 | B2 | B3 |
|---|---|---|---|---|
| DRIVE CAPACITY | | 800 GB | 1600 GB | 3200 GB |
| IN WRITING | MAXIMUM IOPS | 200000 | 180000 | 180000 |
| | POWER CONSUMPTION (W) | 19 | 23 | 25 |
| | POWER CONSUMPTION PER kIOPS | 0.095 | 0.128 | 0.139 |
| IN READING | MAXIMUM IOPS | 600000 | 750000 | 750000 |
| | POWER CONSUMPTION (W) | 18 | 20 | 20 |
| | POWER CONSUMPTION PER kIOPS | 0.030 | 0.027 | 0.027 |
| POWER CONSUMPTION IN IDLE TIME | | 6 | 6 | 6 |

Fig.5

LOGICAL VOLUME

| CONFIGURATION No | | CONFIGURATION 1 | CONFIGURATION 2 | CONFIGURATION 3 | CONFIGURATION 4 |
|---|---|---|---|---|---|
| RAID CONFIGURATION | | A1(800GB)×4 | A2(1600GB)×2 | B1(800GB)×4 | B2(1600GB)×2 |
| IN WRITING | MAXIMUM IOPS | 90000 | 150000 | 200000 | 180000 |
| | POWER CONSUMPTION (W) | 40 | 44 | 50 | 46 |
| | POWER CONSUMPTION PER kIOPS | 0.444 | 0.293 | 0.250 | 0.256 |
| IN READING | MAXIMUM IOPS | 920000 | 900000 | 1200000 | 1500000 |
| | POWER CONSUMPTION (W) | 20 | 20 | 48 | 40 |
| | POWER CONSUMPTION PER kIOPS | 0.022 | 0.022 | 0.040 | 0.027 |
| POWER CONSUMPTION IN IDLE TIME | | 8 | 4 | 24 | 12 |

| CONDITION | RANKING | | | |
|---|---|---|---|---|
| IOPS 50k, READ RATIO 0%, OPERATION RATIO 100% | 4 | 3 | 1 | 2 |
| IOPS 500k, READ RATIO 100%, OPERATION RATIO 100% | 1 | 2 | 4 | 3 |
| IOPS 90k, READ RATIO 50%, OPERATION RATIO 40% | 2 | 1 | 4 | 3 |

US 10,248,344 B2

CONTROL DEVICE

INCORPORATION BY REFERENCE

This application is based upon and claims the benefit of priority from Japanese patent application No. 2016-021982, filed on Feb. 8, 2016, the disclosure of which is incorporated herein in its entirety by reference.

TECHNICAL FIELD

The present invention relates to a control device, specifically, a control device which supports creation of a logical volume formed of a combination of a plurality of storage devices.

BACKGROUND ART

In reducing the power consumption of a logical volume created by using a plurality of storage devices such as disks, the capacities and maximum power consumptions of the respective disks needs to be considered. To be specific, from among configurations capable of building a required capacity, a combination which realizes the minimum power consumption is selected. Moreover, as described in Patent Document 1, from among configurations having a certain performance, a configuration which realizes the minimum power consumption is selected.

Patent Document 1: Japanese Unexamined Patent Application Publication No. JP-A 2013-206101

In recent years, a logical volume is often created by using a plurality of SSDs. Meanwhile, the IOPS performances and power consumptions of SSDs vary depending on venders and capacities. Therefore, simply selecting an SSD with the minimum power consumption may not be enough to obtain a configuration which realizes the minimum power consumption in consideration of an I/O load characteristic.

In other words, regarding a logical volume created by using SSDs, there arises a problem that an appropriate configuration which realizes the minimum power consumption in consideration of a characteristic at the time of use cannot be determined. This may also arise not only when using SSDs but also when determining a configuration of a logical volume created by using other storage devices such as HDDs.

SUMMARY OF THE INVENTION

Accordingly, an object of the present invention is to solve the abovementioned problem that in creating a logical volume by using a plurality of storage devices, it is impossible to minimize a power consumption while considering a characteristic at the time of use.

A control device as an aspect of the present invention includes:

a storage part configured to retain a storage device list including an operation performance of each of storage devices and a power consumption corresponding to the operation performance; and a configuration determination part configured to determine, on a basis of the storage device list, a combination configuration of the storage devices minimizing a power consumption of a whole logical volume formed of the storage devices when the logical volume operates under a set operation performance condition.

Further, a control device as another aspect of the present invention includes a configuration determination part configured to determine, on a basis of a storage device list including an operation performance of each of storage devices and a power consumption corresponding to the operation performance, a combination configuration of the storage devices minimizing a power consumption of a whole logical volume formed of the storage devices when the logical volume operates under a set operation performance condition.

Further, a non-transitory computer-readable medium storing a program as another aspect of the present invention includes instructions for causing a control device to realize a configuration determination part configured to determine, on a basis of a storage device list including an operation performance of each of storage devices and a power consumption corresponding to the operation performance, a combination configuration of the storage devices minimizing a power consumption of a whole logical volume formed of the storage devices when the logical volume operates under a set operation performance condition.

Further, a configuration determination method as another aspect of the present invention includes determining, on a basis of a storage device list including an operation performance of each of storage devices and a power consumption corresponding to the operation performance, a combination configuration of the storage devices minimizing a power consumption of a whole logical volume formed of the storage devices when the logical volume operates under a set operation performance condition.

With the configurations of the present invention as described above, it is possible to minimize a power consumption of a logical volume composed of a plurality of storage devices in consideration of a characteristic at the time of use.

BRIEF DESCRIPTION OF DRAWINGS

FIG. 2 is a diagram showing an example of a storage device list disclosed in FIG. 1;

FIG. 3 is a diagram showing an example of the storage device list disclosed in FIG. 1;

FIG. 5 is a diagram showing how the configuration of a logical volume is determined;

EXEMPLARY EMBODIMENT

<First Exemplary Embodiment>

Figure 1:
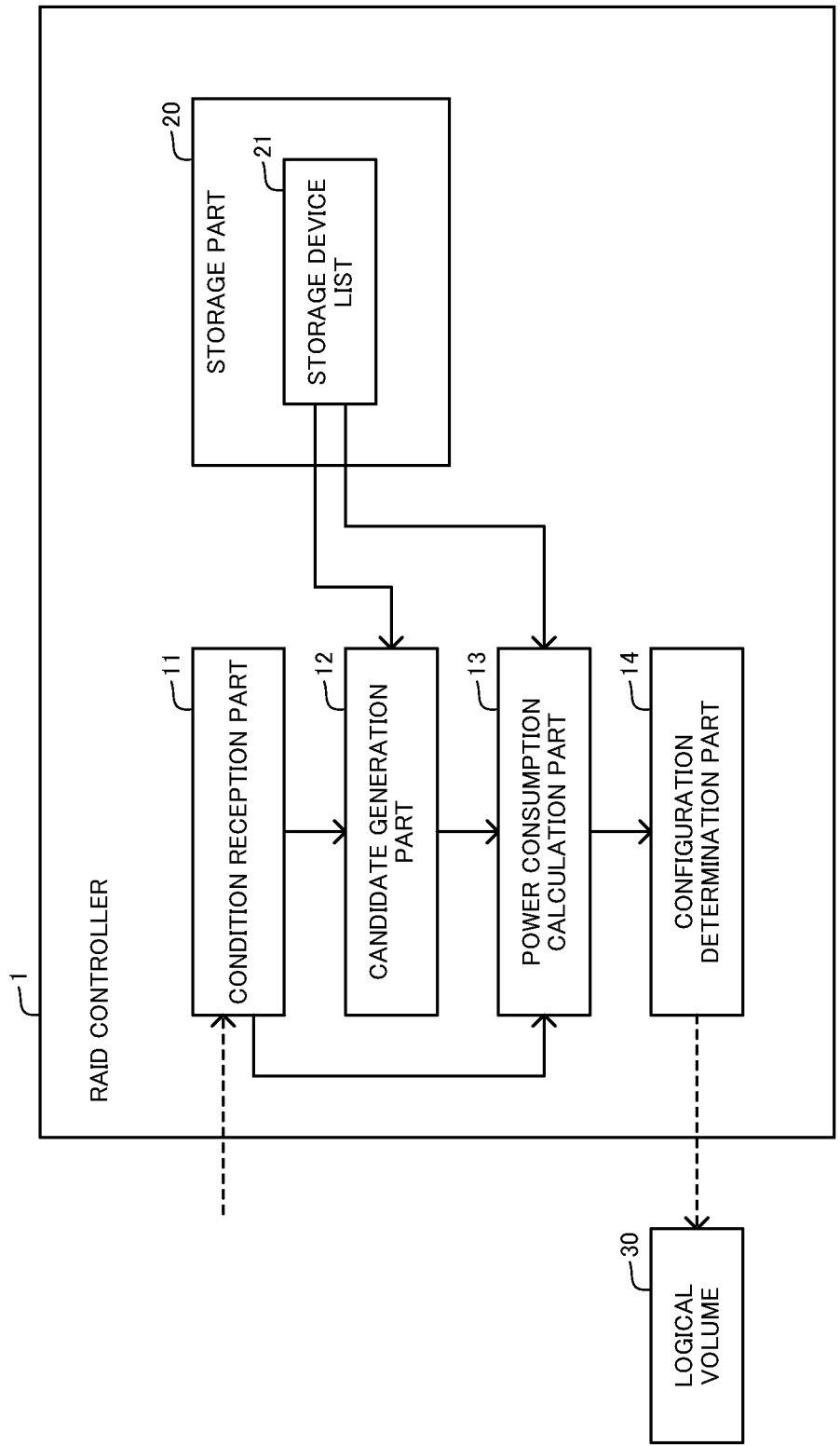
FIG. 1 is a block diagram showing a configuration of a RAID controller according to a first exemplary embodiment of the present invention.
Figure 4:
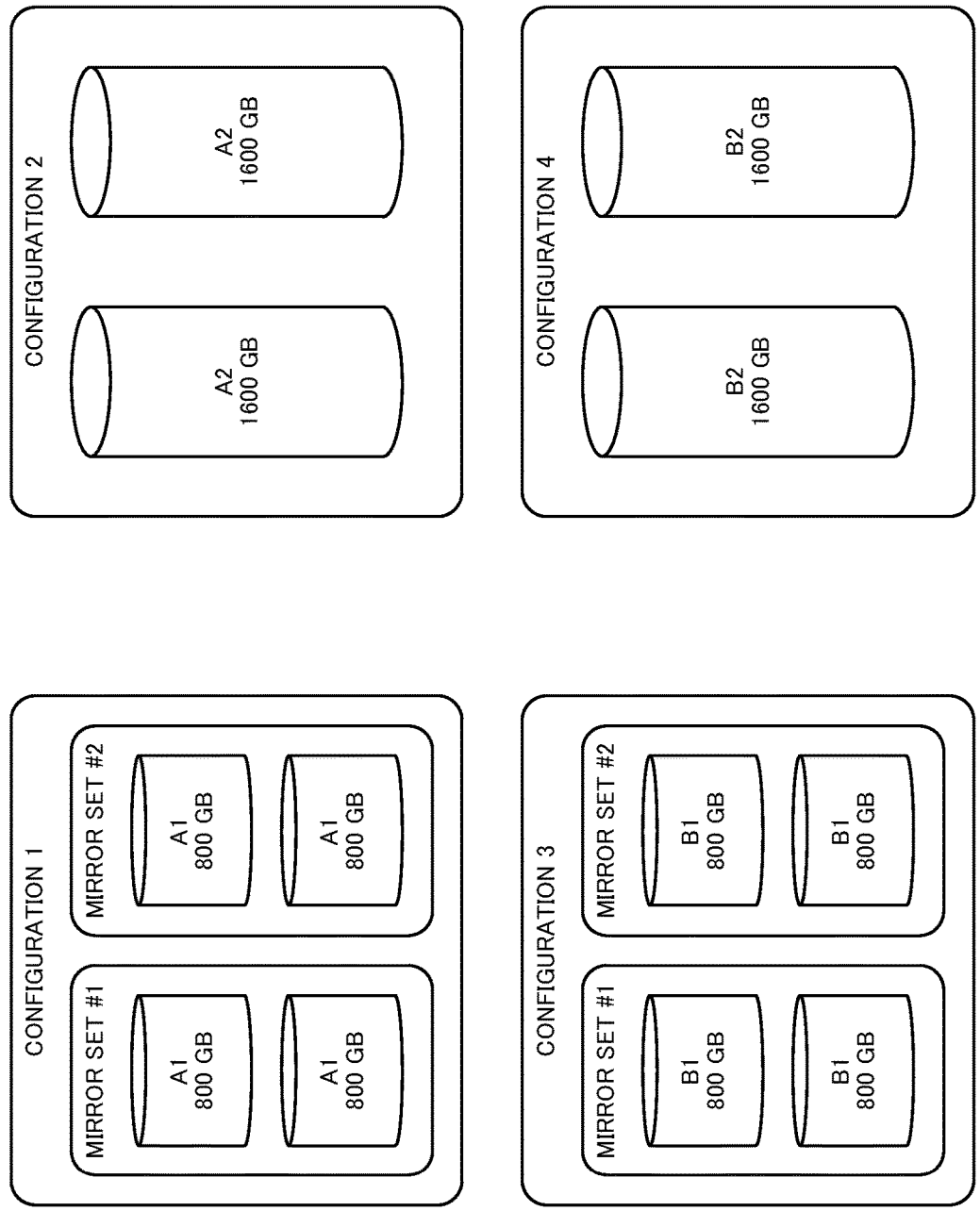
FIG. 4 is a diagram showing how the configuration of a logical volume is determined.
Figure 6:
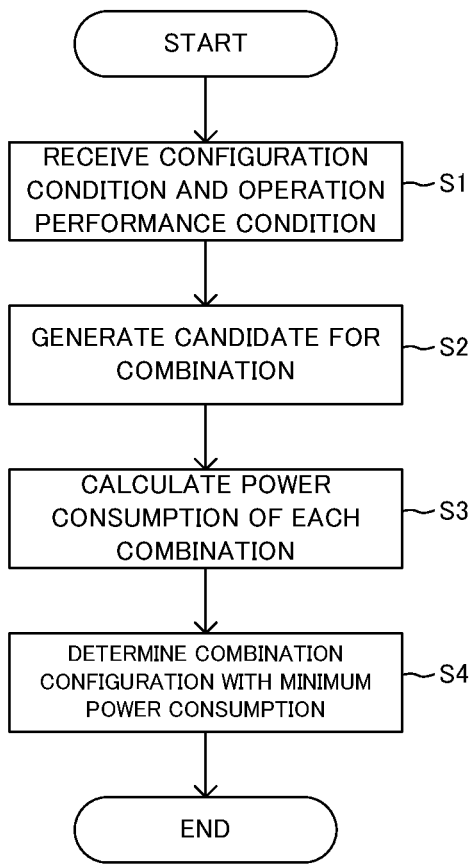
FIG. 6 is a flowchart showing an operation to determine the configuration of a logical volume in the first exemplary embodiment.

A first exemplary embodiment of the present invention will be described with reference to FIGS. 1 to 6. FIGS. 1 to 3 are diagrams for describing a configuration of a RAID controller in a first exemplary embodiment. FIGS. 4 to 6 are diagrams for describing an operation of the RAID controller.

A RAID controller 1 in this exemplary embodiment is a control device which is installed in a storage device including a plurality of storage devices. As described later, the RAID controller 1 has a function to determine a combination configuration of the storage devices configuring one logical volume.

In this exemplary embodiment, the storage devices included by the storage device and configuring a logical volume are SSDs (Solid State Drives). However, the storage devices are not limited to SSDs, and may be HDDs (Hard Disk Drives) or other storage devices.

The RAID controller 1 includes an arithmetic part such as a CPU (Central Processing Unit) and, as shown in FIG. 1, includes a condition reception part 11, a candidate generation part 12, a power consumption calculation part 13, and a configuration determination part 14, which are structured by execution of a program by the arithmetic part. Moreover, as shown in FIG. 1, the RAID controller 1 includes a storage part 20 in which a storage device list 21 is stored.

The storage device list 21 includes information representing the characteristic of each of the SSDs included by the storage device. In this exemplary embodiment, a table is prepared for each SSD manufacturer, and information showing the characteristic of each SSD is stored thereon. As the information showing the characteristics of the SSDs included by the storage device, an example of the table stored in the storage device list 21 will be described with reference to FIGS. 2 and 3.

A table shown in FIG. 2 shows the characteristic of each SSD manufactured by a "company A." First, the table includes the drive capacity (storage capacity) of each SSD. Let us suppose that, in this example, there are three types of SSDs with different drive capacities manufactured by the company A.

Further, the table includes the operation performance of each of the SSDs and a power consumption corresponding to the operation performance. In this exemplary embodiment, specifically, the table includes the reading and writing performances (reading performance, writing performance) of each of the SSDs and power consumptions corresponding to the respective performances, as the operation performances of the SSD.

To be specific, the table includes, as the operation performance of the SSD, a "maximum IOPS (Input/Output per Second) in writing," that is, a number-of-writings performance representing the number of writings per unit time, and includes a "power consumption (W)" at the time. Moreover, in association with this, the table includes a "power consumption" for 1 kIOPS. Likewise, the table includes, as the operation performance, a "maximum IOPS in reading," that is, a number-of-readings performance representing the number of readings per unit time, and includes a "power consumption (W)" at the time. Moreover, in association with this, the table includes a "power consumption" for 1 kOPS.

Furthermore, the table includes, as a power consumption corresponding to the operation performance of the SSD, a "power consumption in the idle time" representing a power consumption when reading or writing is not performed.

The storage device list 21 includes a table of the characteristic of each SSD manufactured by a "company B" as shown in FIG. 3 as well as the table shown in FIG. 2 described above. To be specific, as shown in FIG. 3, the table includes the "maximum IOPS in writing" and a "power consumption (W) at the time," the "maximum IOPS in reading" and a "power consumption (W) at the time," and "power consumption in the idle time" of each of three kinds of SSDs with different drive capacities manufactured by the company B.

Meanwhile, the tables described above are examples and more information may be stored in the storage device list 21.

Next, the functions and operations of the condition reception part 11, the candidate generation part 12, the power consumption calculation part 13 and the configuration determination part 14 included by the RAID controller 1 described above will be described with reference to FIGS. 4 to 6. FIG. 6 is a flowchart showing an operation of the RAID controller 1.

First, the condition reception part 11 receives an input of a "logical volume condition" designated by the user. In this exemplary embodiment, first, the "logical volume condition" includes a "configuration condition" for a logical volume composed of a plurality of SSDs. To be specific, the "configuration condition" for a logical volume includes a "storage capacity of a logical volume" and an "SSD configuration corresponding to a storage method." Herein, the "SSD configuration corresponding to a storage method" is, for example, a RAID level representing the redundancy of a logical volume. Therefore, the "configuration condition" included by the "logical volume condition" is represented as "capacity: 1600 GB, RAID level: 10," for example.

Further, the "logical volume condition" includes an "operation performance condition" for a logical volume. To be specific, the "operation performance condition" includes an "IOPS performance in reading and writing," a "read ratio" and an "operation rate" of a logical volume. Herein, the abovementioned "IOPS (Input/Output per Second)" is a number-of-writings performance per unit time." Therefore, the "operation performance condition" included by the "logical volume condition" is represented as "IOPS performance: 50 k, read ratio: 0%, operation rate: 100%," for example.

Thus, the condition reception part 11 receives an input of information including the "configuration condition" and "operation performance condition" for a logical volume, as a "logical volume condition" designated by the user. For example, the condition reception part 11 receives an input of information such as "volume: 1600 GB, RAID level: 10, IOPS performance: 50 k, read ratio: 0%, operation rate: 100%," as the "logical volume condition." The condition reception part 11 then sets the received information as the "logical volume condition" for a logical volume whose configuration is to be determined (step S1 of FIG. 6).

Subsequently, the candidate generation part 12 (a candidate generation part) generates a candidate for a logical volume formed of a combination configuration of SSDs, on the basis of the "logical volume condition" received and set by the condition reception part 11. Specifically, the candidate generation part 12 generates a candidate for a logical volume formed of a combination configuration of SSDs satisfying the "configuration condition" included by the "logical volume condition" (step S2 of FIG. 6).

For example, in a case where "capacity: 1600 GB, RAID level: 10, IOPS performance: 50 k, read ratio: 0%, operation rate: 100%" is set as the "logical volume condition," the candidate generation part 12 generates a candidate for an SSD combination configuration realizing "capacity: 1600 GB, RAID level: 10" that is the "configuration condition" included by the "logical volume condition." In this case, a storage method is mirroring, so that a logical volume needs two sets of SSDs. As a result, logical volume candidates including four SSD combination configurations as shown in FIG. 4 are generated. Herein, one logical volume configuration is generated by using only SSDs having the same characteristic (performance).

Subsequently, the power consumption calculation part 13 (a configuration determination part) calculates, regarding each of the generated logical volume candidates, a power consumption of a logical volume when the logical volume is caused to operate under the "operation performance condition" included by the set "logical volume condition" (step S3 of FIG. 6). At the time, the power consumption calculation part 13 calculates a power consumption of each logical volume on the basis of the storage device list 21 stored in the storage part 20.

Now a method for calculation of a power consumption of each logical volume by the power consumption calculation part 13 will be described. First, let us suppose the set "operation performance condition" is "IOPS performance: X (IOPS), read ratio: Y (%), operation rate: Z (%)." With reference to the storage device list 21, a power consumption corresponding to an operation performance is calculated for each of the generated logical volume candidates as shown in a table on the upper side of FIG. 5. In other words, the "power consumption (W)" of the "maximum IOPS in writing," the "power consumption (W)" of the "maximum IOPS in reading" and the "power consumption in the idle time" of each of the logical volume candidates are calculated in accordance with the operation performance of the configuring SSDs. Then, by applying the above information (respective power consumptions) to the following calculation formula, it is possible to calculate the power consumption of each logical volume.

Power consumption of logical volume=$X*(Y\%*$
[power consumption per IOPS in reading]+
$(100\%-Y\%)*$[power consumption per IOPS in writing])$*Z\%$+[power consumption in the idle time]$*(1-Z\%)$.

Meanwhile, a power consumption of a logical volume is not limited to being calculated by the above calculation formula and may be calculated by another calculation method.

Then, the configuration determination part 14 (a configuration determination part) determines an SSD combination configuration with the minimum power consumption of the whole logical volume, on the basis of the result of the calculation by the power consumption calculation part 13 (step S4 of FIG. 6). For example, in a case where "IOPS performance: 50 k, read ratio: 0%, operation rate: 100%" is set as the "operation performance condition" included by the "logical volume condition," the power consumption of a "configuration 3" is the minimum as shown on the first line of a table on the lower side of FIG. 5, so that the configuration determination part 14 determines this configuration as a configuration with the minimum power consumption.

The second line of the table on the lower side of FIG. 5 shows a case where "IOPS performance: 500 k, read ratio: 100%, operation rate: 100%" is set as the "operation performance condition," and the power consumption of a "configuration 1" is the minimum. The third line of the table on the lower side of FIG. 5 shows a case where "IOPS performance: 90 k, read ratio: 50%, operation rate: 40%" is set as the "operation performance condition," and the power consumption of a "configuration 2" is the minimum.

Then, the configuration determination part 14 creates a logical volume in the determined SSD combination configuration. At the time, the configuration determination part 14 may automatically create a logical volume by controlling the connection status of each of the SSDs included by the storage device, or may create a logical volume through the user's operation by outputting the determined logical volume configuration to the user.

Thus, it is possible to create a logical volume which realizes the minimum power consumption while satisfying an operation performance designated by the user. As a result, it is possible to cause a logical volume with a desired performance to operate at the minimum power.

Although an IOPS performance, a read ratio and an operation rate are presented as the "operation performance information" in the above description, at least one of them may be the condition, or another operation performance may be the condition.

Further, the RAID controller 1 described above generates candidates for a logical volume formed of an SSD combination configuration satisfying a "configuration condition" and determines a logical volume with the minimum power consumption from among the candidates. However, the RAID controller 1 may, without generating candidates for a logical volume, determine an SSD combination configuration which realizes the minimum power consumption when a logical volume is caused to operate under an "operation performance condition" from among prepared candidates for a logical volume formed of an SSD combination. Moreover, even if any candidate for a logical volume is not prepared, the RAID controller 1 may newly generate and determine an SSD combination configuration with the minimum power consumption in a case where a logical volume is caused to operate under an "operation performance condition"

<Second Exemplary Embodiment>

Figure 7:
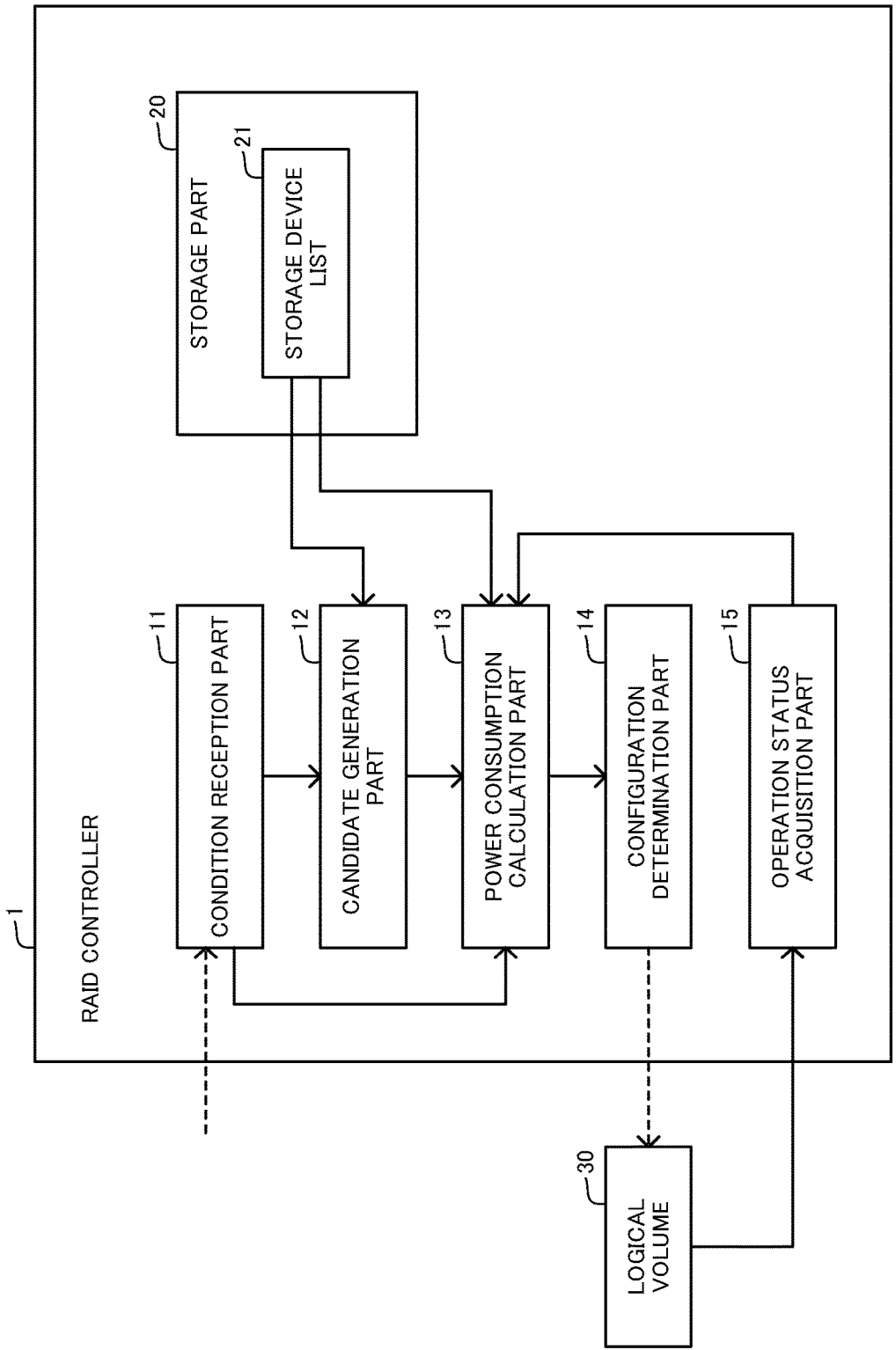
FIG. 7 is a block diagram showing a configuration of a RAID controller according to a second exemplary embodiment of the present invention.
Figure 8:
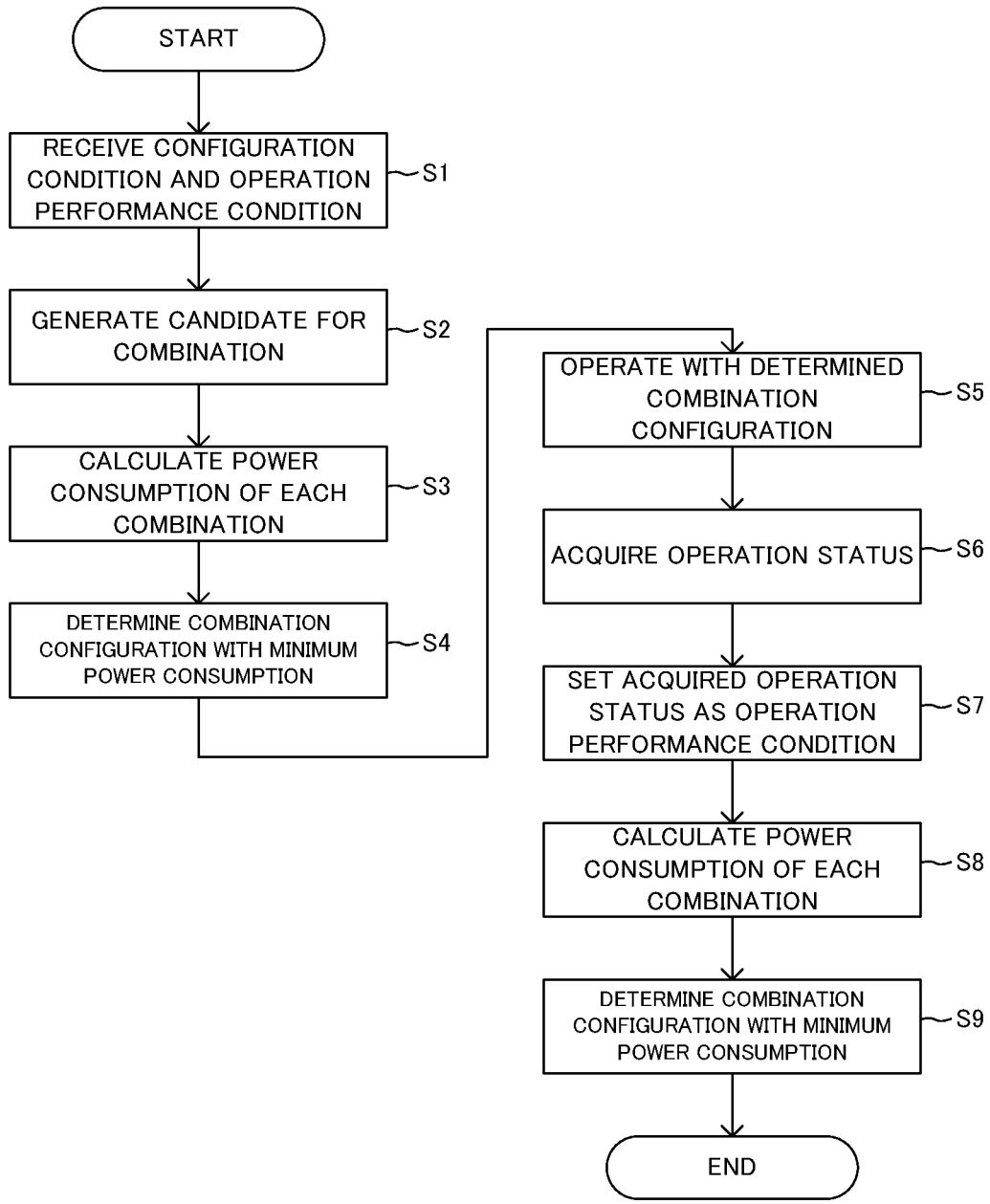
FIG. 8 is a flowchart showing an operation to determine the configuration of a logical volume in the second exemplary embodiment.
Figure 9:
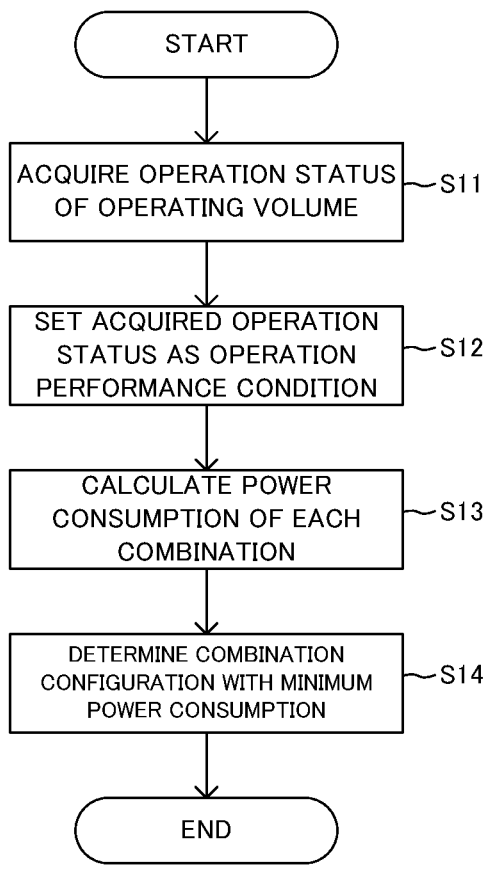
FIG. 9 is a flowchart showing another example of the operation to determine the configuration of a logical volume in the second exemplary embodiment.

Next, a second exemplary embodiment of the present invention will be described with reference to FIGS. 7 to 9. FIG. 7 is a diagram for describing a configuration of a RAID controller 1 in the second exemplary embodiment. FIGS. 8 and 9 are diagrams for describing an operation of the RAID controller.

First, the RAID controller 1 in this exemplary embodiment has a configuration that the RAID controller 1 described in the first exemplary embodiment has. In addition to this, the RAID controller 1 in this exemplary embodiment includes an operation status acquisition part 15 configured by execution of a program by an arithmetic part as shown in FIG. 7.

The RAID controller 1 with the above configuration, as described in the first exemplary embodiment, receives and sets a condition for a logical volume (step S1 of FIG. 8), and determines the logical volume 30 formed of an SSD combination configuration with the minimum power consumption when a logical volume is caused to operate under the condition (steps S2, S3, S4 of FIG. 8). Then, with the determined configuration, the logical volume 30 is caused to operate (step S5 of FIG. 8).

In this exemplary embodiment, the operation status acquisition part 15 thereafter acquires the operation status of the logical volume 30 with the configuration determined by the configuration determination part 14 as described above (step S6 of FIG. 8). An operation status to be acquired is "IOPS performance, read ratio, and read rate" set as the "operation performance condition" in the first exemplary embodiment. Then, the operation status acquisition part 15 notifies the power consumption calculation part 13 of the acquired operation status.

Subsequently, the power consumption calculation part 13 sets the acquired operation status as a "new operation performance condition" (step S7 of FIG. 8). Then, with respect to the logical volume candidates previously generated by the candidate generation part 12, the power consumption calculation part 13 calculates a power consumption of each logical volume when a logical volume is caused to operate under the set "new operation performance condition" (step S8 of FIG. 8). At the time, the power consumption calculation part 13 calculates a power consumption of each logical volume on the basis of the storage device list 21 stored by the storage part 20 as in the first exemplary embodiment.

The configuration determination part 14 determines an SSD combination configuration with the minimum power consumption of the whole logical volume, on the basis of the result of the calculation by the power consumption calculation part 13 (step S9 of FIG. 8). After that, the configuration determination part 14 creates a logical volume in the determined SSD combination configuration.

Thus, even if a logical volume is first created under an "operation performance condition" designated by the user and an actual operation status is different from the operation performance condition, it is possible to create a logical volume with the minimum power consumption in the actual operation status. Therefore, it is possible to cause a logical volume to operate at low power adjusting to an actual status.

In the above description, the configuration determination part 14 determines a logical volume which realizes the minimum power consumption while satisfying an "operation performance condition," and thereafter acquires the operation status of the determined logical volume and sets the operation status as a "new operation performance condition." However, a logical volume which is a target to acquire an operation status is not limited to a configuration with the minimum power consumption determined by the abovementioned method, and may be a configuration determined by any method. In other words, the RAID controller 1 in this exemplary embodiment may operate as shown in a flowchart of FIG. 9.

First, the operation status of an operating logical volume with any configuration is acquired (step S11 of FIG. 9). Then, the acquired operation status is set as a "new operation performance condition" (step S12 of FIG. 9) and, with respect to each of a plurality of logical volumes with different configurations from each other, a power consumption when a logical volume is caused to operate under the set "operation performance condition" is calculated on the basis of the storage device lost 21 (step S13 of FIG. 9). On the basis of the calculation result, an SSD combination configuration with the minimum power consumption of the whole logical volume is determined (step S14 of FIG. 9).

<Third Exemplary Embodiment>

Figure 10:
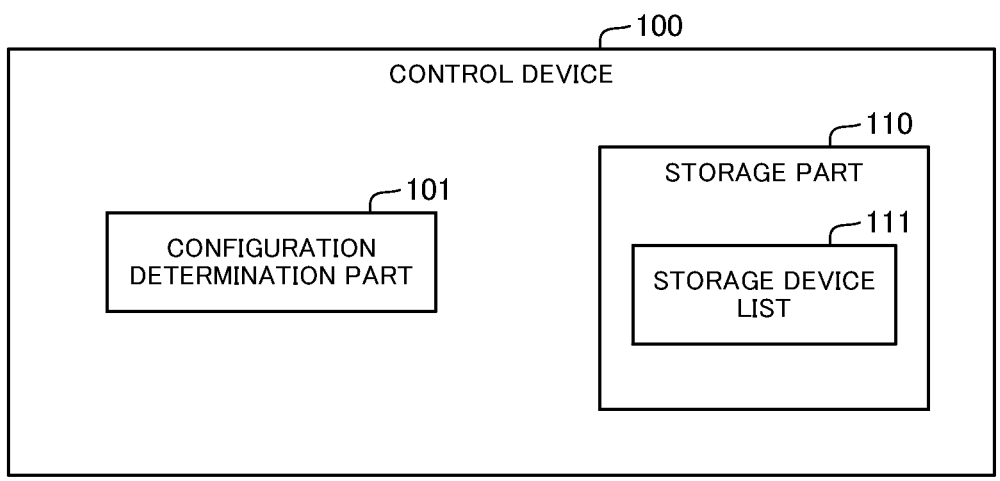
FIG. 10 is a block diagram showing a configuration of a control device according to a third exemplary embodiment of the present invention.
Figure 11:
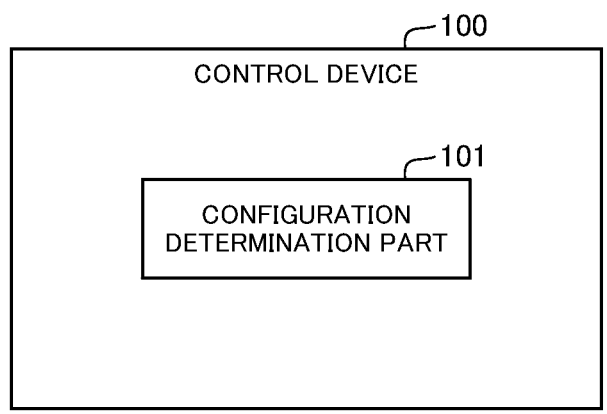
FIG. 11 is a block diagram showing another example of the configuration of the control device according to the third exemplary embodiment of the present invention.
Figure 12:
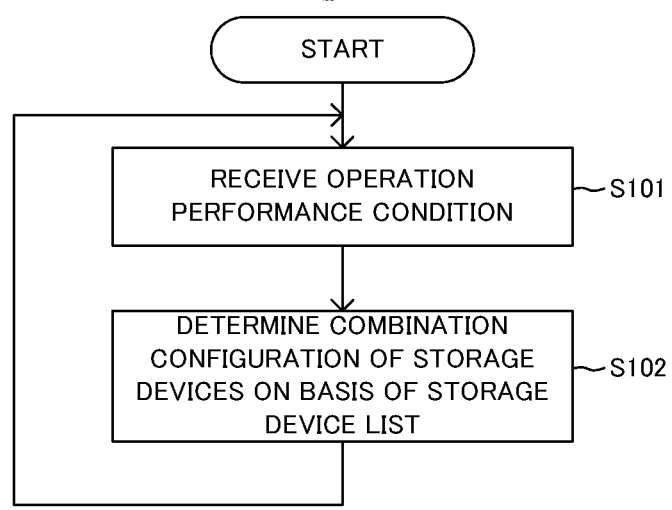
FIG. 12 is a flowchart showing an operation of the control device according to the third exemplary embodiment of the present invention.

Next, a third exemplary embodiment of the present invention will be described with reference to FIGS. 10 to 12. FIGS. 10 and 11 are block diagrams showing a configuration of a control device according to the present invention. FIG. 12 is a flowchart showing an operation of the control device.

As shown in FIG. 10, a control device 100 includes a storage part 110 which retains a storage device list 111 in which an operation performance of each storage device and a power consumption corresponding to the operation performance are stored. In addition, the control device 100 includes a configuration determination part 101 which, in a case where a logical volume formed of a combination of storage devices is caused to operate under a set operation performance condition, determines a combination configuration of storage devices with the minimum power consumption of the whole logical volume. The configuration determination part 101 is created by execution of a program by an arithmetic device included by the control device 100.

The storage device 100 in this exemplary embodiment may be configured so that the storage device list 111 is stored in an external storage device and the storage device list 111 is acquired from the outside. In this case, the control device 100 may include only the configuration determination part 101 described above as shown in FIG. 11.

The control device 100 first receives and sets an operation performance condition (step S101 of FIG. 12). Then, the configuration determination part 101 determines, on the basis of the storage device list 111, a combination configuration of storage devices with the minimum power consumption of the whole logical volume when the logical volume formed of the combination of storage devices under a set operation performance condition (step S102 of FIG. 12).

Thus, according to the present invention, a logical volume which realizes the minimum power consumption while satisfying an operation performance designated by the user can be created. As a result, it is possible to cause a logical volume with a desired performance to operate at the minimum power.

<Supplementary Notes>

The whole or part of the exemplary embodiments disclosed above can be described as the following supplementary notes. Below, the overview of the configurations a control device, a program, and a configuration determination method according to the present invention will be described. However, the present invention is not limited to the following configurations.

(Supplementary Note 1)

A control device comprising:

a storage part configured to retain a storage device list including an operation performance of each of storage devices and a power consumption corresponding to the operation performance; and a configuration determination part configured to determine, on a basis of the storage device list, a combination configuration of the storage devices minimizing a power consumption of a whole logical volume formed of the storage devices when the logical volume operates under a set operation performance condition.

(Supplementary Note 2)

The control device according to Supplementary Note 1, wherein:

the operation performance included by the storage device list includes a reading and writing performance of each of the storage devices; and the configuration determination part is configured to determine, on a basis of the storage device list, a combination configuration of the storage devices minimizing a power consumption of the whole logical volume when the logical volume operates under an operation performance condition including a set reading and writing performance condition.

(Supplementary Note 3)

The control device according to Supplementary Note 2, wherein:

the operation performance included by the storage device list includes a number-of-readings-and-writings performance representing a number of readings and writings per unit time of each of the storage devices; and the configuration determination part is configured to determine, on a basis of the storage device list, a combination configuration of the storage devices minimizing a power consumption of the whole logical volume when the logical volume operates under an operation performance condition including a set condition of the number of readings and writings per unit time.

(Supplementary Note 4)

The control device according to Supplementary Note 2 or 3, wherein:

the operation performance included by the storage device list includes a writing performance and a reading performance of each of the storage devices; and the configuration determination part is configured to determine, on a basis of the storage device list, a combination configuration of the storage devices minimizing a power consumption of the whole logical volume when the logical volume operates under an operation performance condition including a set reading and writing performance condition and a read and write ratio.

(Supplementary Note 5)

The control device according to any of Supplementary Notes 1 to 4, wherein:

the storage device list includes a power consumption in an idle time as the power consumption corresponding to the operation performance; and the configuration determination part is configured to determine, on a basis of the storage device list, a combination configuration of the storage devices minimizing a power consumption of the whole logical volume when the logical volume operates under an operation performance condition including a set operation rate.

(Supplementary Note 6)

The control device according to any of Supplementary Notes 1 to 5, comprising an operation status acquisition part configured to acquire an operation status of a logical volume formed of a combination configuration of the storage devices, wherein the configuration determination part is configured to set the acquired operation status as an operation performance condition and determine, on a basis of the storage device list, a combination configuration of the storage devices minimizing a power consumption of the whole logical volume when the logical volume operates under the operation performance condition.

(Supplementary Note 7)

The control device according to Supplementary Note 6, wherein:

the operation status acquisition part is configured to acquire an operation status of the operating logical volume formed of the combination configuration of the storage devices determined by the configuration determination part; and the configuration determination part is configured to set the acquired operation status as a new operation performance condition and determine, on a basis of the storage device list, a combination configuration of the storage devices minimizing a power consumption of the whole logical volume when the logical volume operates under the new operation performance condition.

(Supplementary Note 8)

The control device according to any of Supplementary Notes 1 to 7, wherein the configuration determination part is configured to determine, on a basis of the storage device list, a combination configuration of the storage devices minimizing a power consumption of the whole logical volume when the logical volume operates under a set operation performance condition, from among a plurality of logical volumes with different combination configurations of the storage devices.

(Supplementary Note 9)

The control device according to Supplementary Note 8, wherein the storage device list includes a storage capacity of each of the storage devices, the control device comprising a candidate generation part configured to generate, on a basis of the storage device list, candidates for a logical volume formed of a combination configuration of the storage devices satisfying a set configuration condition of the logical volume, wherein the configuration determination part is configured to determine, on a basis of the storage device list, a combination configuration of the storage devices minimizing a power consumption of the whole logical volume when the logical volume operates under a set operation performance condition, from among the generated candidates for the logical volume.

(Supplementary Note 10)

The control device according to Supplementary Note 9, wherein:

the candidate generation part is configured to generate candidates for a logical volume formed of a combination configuration of the storage devices satisfying a configuration condition of the logical volume including a set storage capacity of the logical volume and a configuration of the storages devices corresponding to a storage method; and the configuration determination part is configured to determine, on a basis of the storage devices list, a combination configuration of the storage devices minimizing a power consumption of the whole logical volume when the logical volume operates under a set operation performance condition, from among the generated candidates for the logical volume.

(Supplementary Note 11)

A control device comprising a configuration determination part configured to determine, on a basis of a storage device list including an operation performance of each of storage devices and a power consumption corresponding to the operation performance, a combination configuration of the storage devices minimizing a power consumption of a whole logical volume formed of the storage devices when the logical volume operates under a set operation performance condition.

(Supplementary Note 12)

A configuration determination method comprising determining, on a basis of a storage device list including an operation performance of each of storage devices and a power consumption corresponding to the operation performance, a combination configuration of the storage devices minimizing a power consumption of a whole logical volume formed of the storage devices when the logical volume operates under a set operation performance condition.

(Supplementary Note 13)

The configuration determination method according to claim 12, wherein the operation performance included by the storage device list includes a reading and writing performance of each of the storage devices, the configuration determination method comprising determining, on a basis of the storage device list, a combination configuration of the storage devices minimizing a power consumption of the whole logical volume when the logical volume operates under an operation performance condition including a set reading and writing performance condition.

(Supplementary Note 14)

The configuration determination method according to Supplementary Note 13, wherein the operation performance included by the storage device list includes a number-of-readings-and-writings performance representing a number of readings and writings per unit time of each of the storage devices, the configuration determination method comprising determining, on a basis of the storage device list, a combination configuration of the storage devices minimizing a power consumption of the whole logical volume when the logical volume operates under an operation performance condition including a set condition of the number of readings and writings per unit time.

(Supplementary Note 15)

The configuration determination method according to Supplementary Note 13, wherein the operation performance included by the storage device list includes a writing performance and a reading performance of each of the storage devices, the configuration determination method comprising determining, on a basis of the storage device list, a combination configuration of the storage devices minimizing a power consumption of the whole logical volume when the logical volume operates under an operation performance condition including a set reading and writing performance condition and a read and write ratio.

(Supplementary Note 16)

The configuration determination method according to any of Supplementary Notes 12 to 15, wherein the storage device list includes a power consumption in an idle time as the power consumption corresponding to the operation performance, the configuration determination method comprising determining, on a basis of the storage device list, a combination configuration of the storage devices minimizing a power consumption of the whole logical volume when the logical volume operates under an operation performance condition including a set operation rate.

(Supplementary Note 17)

The configuration determination method according to any of Supplementary Notes 12 to 16, comprising acquiring an operation status of a logical volume formed of a combination configuration of the storage devices; and setting the acquired operation status as an operation performance condition and determining, on a basis of the storage device list, a combination configuration of the storage devices minimizing a power consumption of the whole logical volume when the logical volume operates under the operation performance condition.

(Supplementary Note 18)

The configuration determination method according to Supplementary Note 17, comprising:

acquiring an operation status of the operating logical volume formed of the determined combination configuration of the storage devices; setting the acquired operation status as a new operation performance condition; and determining, on a basis of the storage device list, a combination configuration of the storage devices minimizing a power consumption of the whole logical volume when the logical volume operates under the new operation performance condition.

(Supplementary Note 19)

The configuration determination method according to any of Supplementary Notes 12 to 18, determining, on a basis of the storage device list, a combination configuration of the storage devices minimizing a power consumption of the whole logical volume when the logical volume operates under a set operation performance condition, from among a plurality of logical volumes with different combination configurations of the storage devices.

(Supplementary Note 20)

The configuration determination method according to Supplementary Note 19, wherein the storage device list includes a storage capacity of each of the storage devices, the configuration determination method comprising determining, on a basis of the storage device list, a combination configuration of the storage devices minimizing a power consumption of the whole logical volume when the logical volume operates under a set operation performance condition, from among combination configurations of the storage devices satisfying a set configuration condition of the logical volume.

(Supplementary Note 21)

The configuration determination method according to Supplementary Note 20, comprising:

generating candidates for a logical volume formed of a combination configuration of the storage devices satisfying a configuration condition of the logical volume including a set storage capacity of the logical volume and a configuration of the storage devices corresponding to a storage method; and determining, on a basis of the storage device list, a combination configuration of the storage devices minimizing a power consumption of the whole logical volume when the logical volume operates under a set operation performance condition, from among the generated candidates for the logical volume.

(Supplementary Note 22)

A non-transitory computer-readable medium storing a program comprising instructions for causing a control device to realize:

a configuration determination part configured to determine, on a basis of a storage device list including an operation performance of each of storage devices and a power consumption corresponding to the operation performance, a combination configuration of the storage devices minimizing a power consumption of a whole logical volume formed of the storage devices when the logical volume operates under a set operation performance condition.

(Supplementary Note 23)

The non-transitory computer-readable medium storing the program according to Supplementary Note 22, wherein:

the operation performance included by the storage device list includes a reading and writing performance of each of the storage devices; and the configuration determination part is configured to determine, on a basis of the storage device list, a combination configuration of the storage devices minimizing a power consumption of the whole logical volume when the logical volume operates under an operation performance condition including a set reading and writing performance condition.

(Supplementary Note 24)

The non-transitory computer-readable medium storing the program according to Supplementary Note 23, wherein:

the operation performance included by the storage device list includes a number-of-readings-and-writings performance representing a number of readings and writings per unit time of each of the storage devices; and the configuration determination part is configured to determine, on a basis of the storage device list, a combination configuration of the storage devices minimizing a power consumption of the whole logical volume when the logical volume operates under an operation performance condition including a set condition of the number of readings and writings per unit time.
(Supplementary Note 25)
The non-transitory computer-readable medium storing the program according to Supplementary Note 23 or 24, wherein:
the operation performance included by the storage device list includes a writing performance and a reading performance of each of the storage devices; and
the configuration determination part is configured to determine, on a basis of the storage device list, a combination configuration of the storage devices minimizing a power consumption of the whole logical volume when the logical volume operates under an operation performance condition including a set reading and writing performance condition and a read and write ratio.
(Supplementary Note 26)
The non-transitory computer-readable medium storing the program according to any of Supplementary Notes 22 to 25, wherein:
the storage device list includes a power consumption in an idle time as the power consumption corresponding to the operation performance; and
the configuration determination part is configured to determine, on a basis of the storage device list, a combination configuration of the storage devices minimizing a power consumption of the whole logical volume when the logical volume operates under an operation performance condition including a set operation rate.
(Supplementary Note 27)
The non-transitory computer-readable medium storing the program according to any of Supplementary Notes 22 to 26, further comprising instructions for causing the control device to realize an operation status acquisition part configured to acquire an operation status of a logical volume formed of a combination configuration of the storage devices,
wherein the configuration determination part is configured to set the acquired operation status as an operation performance condition and determine, on a basis of the storage device list, a combination configuration of the storage devices minimizing a power consumption of the whole logical volume when the logical volume operates under the operation performance condition.
(Supplementary Note 28)
The non-transitory computer-readable medium storing the program according to Supplementary Note 27, wherein:
the operation status acquisition part is configured to acquire an operation status of the operating logical volume formed of the combination configuration of the storage devices determined by the configuration determination part; and
the configuration determination part is configured to set the acquired operation status as a new operation performance condition and determine, on a basis of the storage device list, a combination configuration of the storage devices minimizing a power consumption of the whole logical volume when the logical volume operates under the new operation performance condition.
(Supplementary Note 29)
The non-transitory computer-readable medium storing the program according to any of Supplementary Notes 22 to 28, wherein the configuration determination part is configured to determine, on a basis of the storage device list, a combination configuration of the storage devices minimizing a power consumption of the whole logical volume when the logical volume operates under a set operation performance condition, from among a plurality of logical volumes with different combination configurations of the storage devices.
(Supplementary Note 30)
The non-transitory computer-readable medium storing the program according to Supplementary Note 29, wherein the storage device list includes a storage capacity of each of the storage devices,
the non-transitory computer-readable medium storing the program further comprising instructions for causing the control device to realize a candidate generation part configured to generate, on a basis of the storage device list, candidates for a logical volume formed of a combination configuration of the storage devices satisfying a set configuration condition of the logical volume,
wherein the configuration determination part is configured to determine, on a basis of the storage device list, a combination configuration of the storage devices minimizing a power consumption of the whole logical volume when the logical volume operates under a set operation performance condition, from among the generated candidates for the logical volume.
(Supplementary Note 31)
The non-transitory computer-readable medium storing the program according to Supplementary Note 30, wherein:
the candidate generation part is configured to generate candidates for a logical volume formed of a combination configuration of the storage devices satisfying a configuration condition of the logical volume including a set storage capacity of the logical volume and a configuration of the storage devices corresponding to a storage method; and;
the configuration determination part is configured to determine, on a basis of the storage device list, a combination configuration of the storage devices minimizing a power consumption of the whole logical volume when the logical volume operates under a set operation performance condition, from among the generated candidates for the logical volume.

The abovementioned program is stored in a storage device or recorded on a non-transitory computer-readable recording medium. For example, the recording medium is a portable medium such as a flexible disk, an optical disk, a magneto-optical disk and a semiconductor memory.

Although the present invention is described above with reference to the exemplary embodiments and so on, the present invention is not limited to the exemplary embodiments described above. The configurations and details of the present invention can be changed in various manners that can be understood by one skilled in the art within the scope of the present invention.

DESCRIPTION OF REFERENCE NUMERALS

1 RAID controller
11 condition reception part
12 candidate generation part
13 power consumption calculation part
14 configuration determination part
15 operation condition acquisition part
20 storage part
21 storage device list
30 logical volume
100 control device
101 configuration determination part
110 storage part
111 storage device list

The invention claimed is:

1. A control device comprising:
a memory storing instructions; and
a processor configured to execute the instructions to:
retain a storage device list including an operation performance of each of storage devices and a power consumption corresponding to the operation performance;
generate candidates for a logical volume formed of a combination configuration of the storage devices, the logical volume satisfying a set configuration condition; and
determine, based on the storage device list and the generated candidates for the logical volume, a combination configuration of the storage devices minimizing a power consumption of a whole logical volume formed of the storage devices when the logical volume operates under a set operation performance condition.

2. The control device according to claim 1, wherein:
the operation performance included by the storage device list includes a reading and writing performance of each of the storage devices; and
the operation performance condition includes a set reading and writing performance condition.

3. The control device according to claim 2, wherein:
the operation performance included by the storage device list includes a number-of-readings-and-writings performance representing a number of readings and writings per unit time of each of the storage devices; and
the operation performance condition includes a set condition of the number of readings and writings per unit time.

4. The control device according to claim 2, wherein:
the operation performance condition includes a set reading and writing performance condition and a read and write ratio.

5. The control device according to claim 1, wherein:
the storage device list includes a power consumption in an idle time during which reading or writing is not performed as the power consumption corresponding to the operation performance; and
the operation performance condition includes an operation rate representing a rate of performing reading or writing.

6. The control device according to claim 1, wherein the processor is further configured to execute the instructions to:
acquire an operation status of a logical volume formed of a combination configuration of the storage devices; and
set the acquired operation status as an operation performance condition.

7. The control device according to claim 6, wherein the processor is further configured to execute the instructions to:
set the acquired operation status as a new operation performance condition; and
determine, based on the storage device list and the generated candidates for the logical volume, a combination configuration of the storage devices minimizing a power consumption of the whole logical volume when the logical volume operates under the new operation performance condition.

8. The control device according to claim 1, wherein the storage device list includes a storage capacity of each of the storage devices.

9. The control device according to claim 8, wherein the processor is further configured to execute the instructions to:
generate candidates for a logical volume formed of a combination configuration of the storage devices satisfying a configuration condition of the logical volume including a set storage capacity of the logical volume.

10. A configuration determination method comprising:
retaining a storage device list including an operation performance of each of storage devices and a power consumption corresponding to the operation performance;
generating candidates for a logical volume formed of a combination configuration of the storage devices, the logical volume satisfying a set configuration condition; and
determining, based on a storage device list and the generated candidates for the logical volume, the storage device list including an operation performance of each of storage devices and a power consumption corresponding to the operation performance, a combination configuration of the storage devices minimizing a power consumption of a whole logical volume formed of the storage devices when the logical volume operates under a set operation performance condition.

11. The configuration determination method according to claim 10, wherein the operation performance included by the storage device list includes a reading and writing performance of each of the storage devices; and
the operation performance condition includes a set reading and writing performance condition.

12. The configuration determination method according to claim 11, wherein the operation performance included by the storage device list includes a number-of-readings-and-writings performance representing a number of readings and writings per unit time of each of the storage devices; and
the operation performance condition includes a set condition of the number of readings and writings per unit time.

13. The configuration determination method according to claim 11, wherein the operation performance condition includes a set reading and writing performance condition and a read and write ratio.

14. The configuration determination method according to claim 10, wherein the storage device list includes a power consumption in an idle time during which reading or writing is not performed as the power consumption corresponding to the operation performance; and
the operation performance condition includes a set operation rate representing a rate of performing reading or writing.

15. The configuration determination method according to claim 10, further comprising:
acquiring an operation status of a logical volume formed of a combination configuration of the storage devices; and
setting the acquired operation status as an operation performance condition.

16. The configuration determination method according to claim 15, further comprising:
acquiring an operation status of the operating logical volume formed of the determined combination configuration of the storage devices;
setting the acquired operation status as a new operation performance condition; and
determining, based on the storage device list, a combination of the storage devices minimizing a power consumption of the whole logical volume when the logical volume operates under the new operation performance condition.

17. The configuration determination method according to claim 10, further comprising:

determining, based on the storage device list and a plurality of logical volumes with different combination configurations of the storage devices, a combination configuration of the storage devices minimizing a power consumption of the whole logical volume when the logical volume operates under a set operation performance condition.

18. The configuration determination method according to claim 17, wherein the storage device list includes a storage capacity of each of the storage devices, and further comprising:

determining, based on the storage device list and combination configurations of the storage devices satisfying a set configuration condition of the logical volume, a combination configuration of the storage devices minimizing a power consumption of the whole logical volume when the logical volume operates under a set operation performance condition.

* * * * *